Dec. 12, 1950

H. L. FITCH 2,533,447

CONTINUOUS CONTROL PRINTER

Filed Aug. 15, 1946

Harold L. Fitch
INVENTOR

BY
ATTORNEYS

Dec. 12, 1950 H. L. FITCH 2,533,447
CONTINUOUS CONTROL PRINTER
Filed Aug. 15, 1946 2 Sheets-Sheet 2
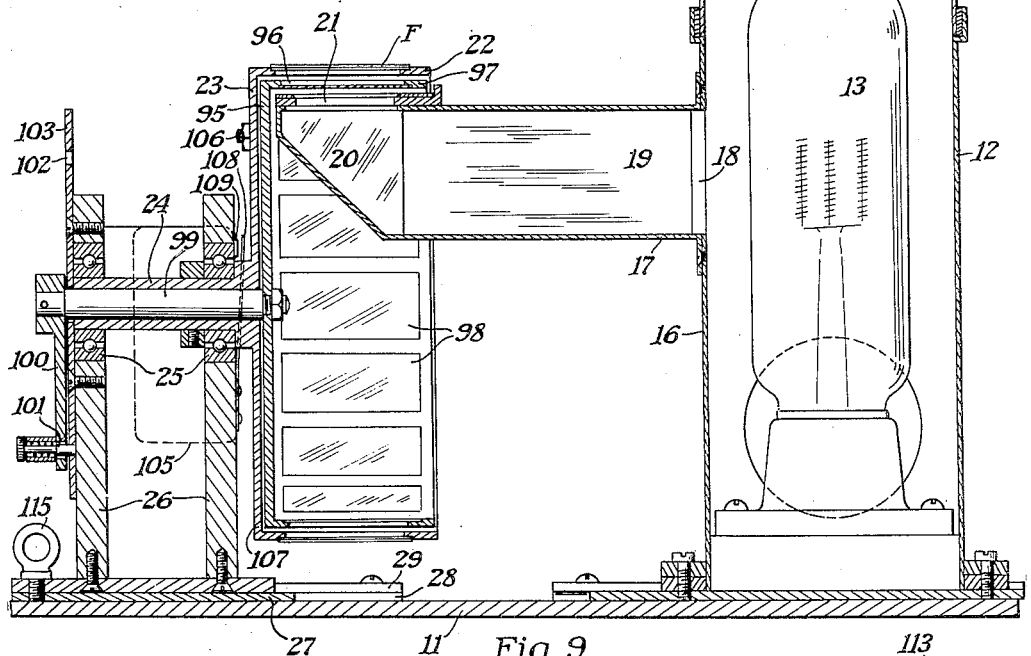
Fig. 5.
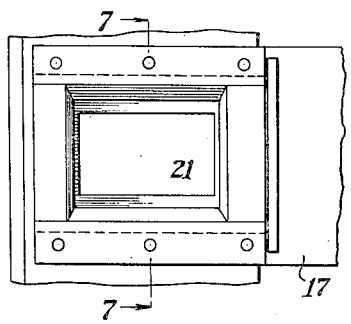
Fig. 6.
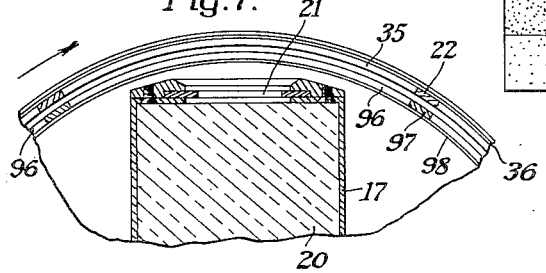
Fig. 7.
Fig. 9.
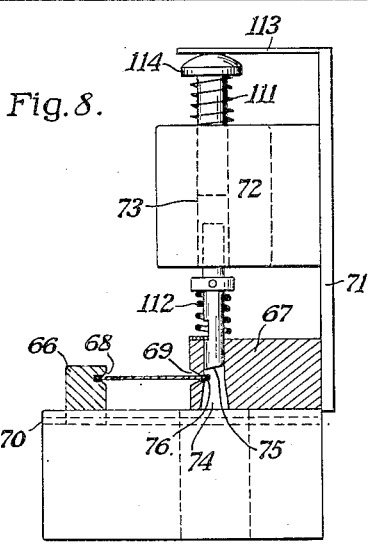
Fig. 8.
Harold L. Fitch
INVENTOR
BY
ATTORNEYS Patented Dec. 12, 1950

2,533,447

UNITED STATES PATENT OFFICE 2,533,447

CONTINUOUS CONTROL PRINTER

Harold L. Fitch, Rochester, N. Y., assignor to Eastman Kodak Company, Rochester, N. Y., a corporation of New Jersey Application August 15, 1946, Serial No. 690,658

14 Claims. (Cl. 95—75)

1

The present invention relates to photography, and more particularly to an automatic printing device.

The principal object of the invention is the provision of a contact printer in which a light modulating member is repeatedly and periodically passed across an exposure aperture in contact with a film strip to print the image of said member intermittently on said strip.

Still another object of the invention is the provision of means for marking or notching the web between said printings.

A further object of the invention is the provision of means for determining and controlling the color temperature of the printing light.

To these and other ends, the invention resides in certain improvements and combinations of parts, all as will be hereinafter more fully described, the novel features being pointed out in the claims at the end of the specification.

In the drawings:

Fig. 5 is a vertical sectional view through the light source and the printing drum, and taken substantially in line 5—5 of Fig. 2, showing the arrangement of the parts;

Fig. 6 is a top view of the printing drum and printing aperture, shown in Fig. 6;

Fig. 7 is a vertical sectional view through the printing drum and the printing aperture, and taken substantially in line 7—7 of Fig. 6, showing the arrangement of the parts;

Fig. 8 is a side elevation view of the notching device shown in Fig. 3, with parts of section, showing the arrangement of the adjustable film supporting member and the notching plunger; and Fig. 9 is a view of one form of light modulating member which is applied to the printing aperture and which is to be repeatedly printed on a continuous film strip or web.

Similar reference numerals throughout the various views indicate the same parts.

The present invention relates to a printer for use in the control of black-and-white or color processes. As is well known, when the processing liquids or solutions approach exhaustion, the quality of the print falls off. It is essential, therefore, that in order to assure the desired quality of prints, the processing solutions must be maintained at the proper consistencies. For this reason, periodic tests of solutions are made. One method of making such a test is to provide two printed image strips which have been exposed under exactly the same condition, and to then process one of the strips in a solution of proper and known consistency. This processed strip may then be used as a standard or reference strip. The solution in question may then be checked by passing the second unprocessed strip therethrough. This second strip is then compared with the standard or reference strip which has been processed under known proper conditions. If the second strip checks the standard strip, the solution is satisfactory; but, if not, then the solution must be corrected, replenished or discarded, as will be readily appreciated by those in the art.

In order to provide such a standard or reference strip and the test strips which are to be compared therewith, the present invention provides a printer by which a plurality of exact duplicate prints or latent images of a master light-modulating member are made repeatedly on a long strip or web of photographic film under controlled light conditions. This web is automatically notched or marked to designate the divisions between such prints on the strip. One of these prints is then detached from the web and processed under exact known conditions to produce a standard or test strip. Then, when a solution is to be tested, one or more additional unprocessed prints are removed from the web, the notches clearly indicating the position of the unprocessed prints on the web. After these second strips are passed through the solution to be tested, they provide a ready and accurate means for comparison with the standard strip to indicate the condition of the solution. Thus the condition of the solution may be readily, easily and accurately determined to thus assure the production of prints of the desired quality.

Figure 2:
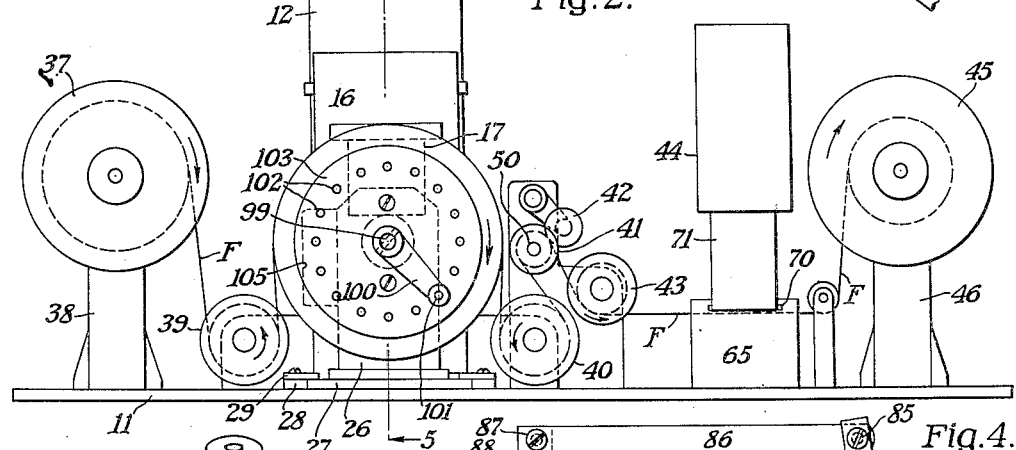
Fig. 2 is a front elevation view of the printer illustrated in Fig. 1.

The drawings show a printer for making such duplicate prints on a strip of photographic film F. This printer comprises a base 11 on which the various parts are assembled. A lamphouse 12 extends upwardly from the base 11 and houses a light source which, in the present embodiment, is in the form of a 500-watt, calibrated bulb or lamp 13 which is connected to a suitable source of electric power, not shown. In order to control the lamp color temperature, the current to the bulb is passed through a very sensitive ammeter, not shown, which may be adjusted to provide the desired color temperature. The lamp 13 is preferably cooled by air supplied by a fan 14 driven by an electric motor 15. The side 16 and the lamphouse 12 has secured thereto a laterally projecting tubular member 17 which communicates with the interior of the lamphouse through the opening 18 formed in the wall 16. The member 17 houses a light integrating bar 19 and a prism 20 which directs the light from the lamp 13 laterally and upwardly to a printing aperture 21 positioned below and inside an overhanging cylindrical periphery 22 of a printing drum 23. The latter is provided with a hollow supporting shaft 24 mounted in ball bearings 25 so that the drum is freely rotatable, for reasons to be later described. The ball bearings are mounted in spaced supports 26 extending upwardly from a carriage 27 slidably mounted on the base 11 for movement toward and away from the lamphouse, for reasons to be hereinafter more fully described. To secure this sliding movement, the base 11 has formed thereon a pair of space lugs 28 to the tops of which are secured plates 29 which overhang the carriage 27 to hold the latter on the base 11 and to provide a pair of channels or track-like members in which the carriage may slide, as best shown in Figs. 2 and 5.

The periphery 22 of the printing drum 23 is provided with a circumferential slot or exposing aperture 35 over which is positioned a light-modulating member 36 which may be, for example, in the form of an H & D step tablet which produces the intensity scale modulations of the light on the film strip F which is to be printed. This modulating member or step tablet may be either black-and-white or colored, depending on the process with which it is to be used, and constitutes images which have been made under exact and controlled light conditions, and which have been processed in solutions of proper consistency to provide a master record of known quality which is printed repeatedly by a light of controlled color onto the strip F of photographic film to provide a plurality of identical and duplicate prints or latent images of the step tablet on the strip.

The unexposed film strip F which is to be printed is mounted on a supply reel 37 carried by a standard 38 extending upwardly from the base 11. From the reel 38, the film F is passed under an idler roller 39, see Fig. 2, and is then wrapped around a portion of the periphery 22 of the printing drum 23 and then passes under a second idler roller 40 positioned to the right and below the center of the printing drum, as best shown in Fig. 2. The rollers 39 and 40 thus assure sufficient wrap of the film F over the drum 23 and hold the film in contact with the step tablet 36 during the passage thereof over the printing aperture 21 and during the printing operation. The drum 23 is driven solely by the movement of the film F thereover, the latter being moved by means to be presently described. From the roller 40, the film F passes over a drive roller 41 against which the film is held by a spring-pressed roller 42. The film strip then passes under an idler roller 43 and through the notching mechanism, generally indicated by the numeral 44, and is finally wound up on the take-up reel 45 mounted on a standard 46 carried by the base 11.

The drum 23 is thus suspended on a freely rotatable shaft on the slidable carriage 27, and is driven solely by the moving film F which is propelled by the drive roller 41 carried by a shaft 50 on which is mounted a pulley 51 connected by a belt 52 to a pulley 53 carried by shaft 54. The latter has also mounted thereon a second pulley 55 connected by a belt 56 to a pulley 57 carried by a shaft 58 connected to the take-up reel 45 to drive the latter. Thus the film drive roller 41 and the take-up reel are both driven from the shaft 54. In order to secure exact reproductions of the step tablet 36 on the strip F, it is essential that the latter be moved at a constant and uniform speed over the printing aperture during the printing operation. To secure this result, the shaft 54 is connected through reducing gears 59 to a constant-speed motor 60. Thus the film F is moved continuously and uniformly over the printing aperture and each revolution of the latter prints an image of the step tablet on the moving film F, the images being exact duplicates of each other. By means of this arrangement, the image of the step tablet is repeated uniformly along the film strip F.

Figure 1:
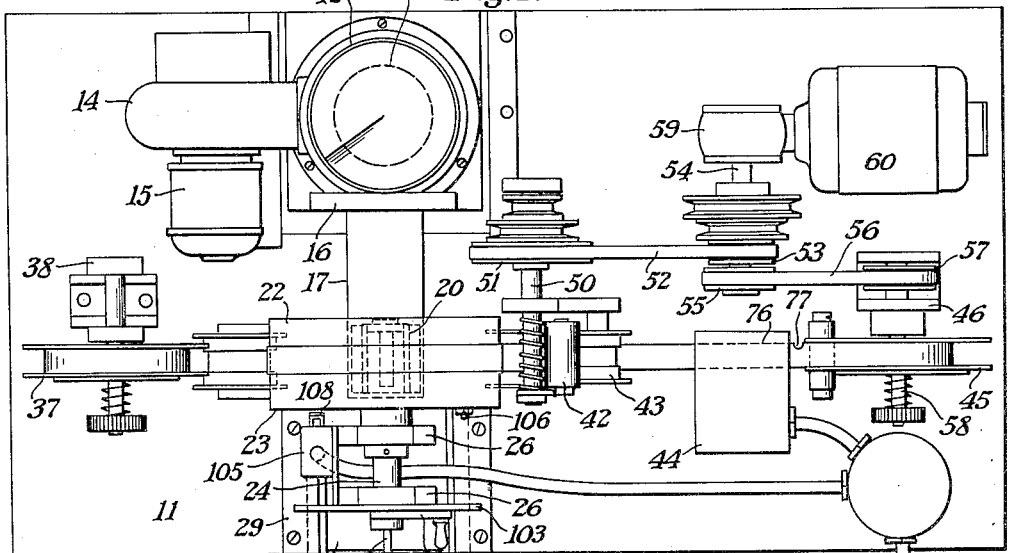
Fig. 1 is a plan view of the printer of the present invention.

In order to readily and easily ascertain the positions of these various images, the strip F is notched or marked along an edge between said image so that by removing a section of the strip between a pair of such notches, a complete image of the step tablet is secured. This removed portion is then processed and used in the manner above described. The notching device 44 comprises, in the present embodiment, a base or supporting member 65 on which are mounted a pair of film engaging and supporting members 66 and 67 having aligned slots 68 and 69, respectively, which are adapted to engage and support the opposite marginal edges of the film strip F, as shown in Fig. 8. In order to accommodate the notching device for film of different widths such, for example, as 16-mm. and 35-mm., the supporting members 66 and 67 are slidably mounted toward and away from each other in grooves 70 formed in the base 65. The right film supporting member 67 has secured thereto an upstanding plate 71 on which is mounted a solenoid 72, the plunger 73 of which extends downwardly therefrom and into an opening 74 in the member 67 and terminates in a notching edge 75 positioned adjacent an edge 76 to the film strip F, all as shown in Fig. 8. It will now be apparent that if the solenoid is actuated, by means to be later described, to move the plunger 73 downwardly, the end 75 will engage the edge 76 thereof to notch the latter, as shown at 77 in Fig. 1. Thus the edge 76 of the film F may be notched to clearly indicate the positions of the various printed images thereon.

Figure 3:
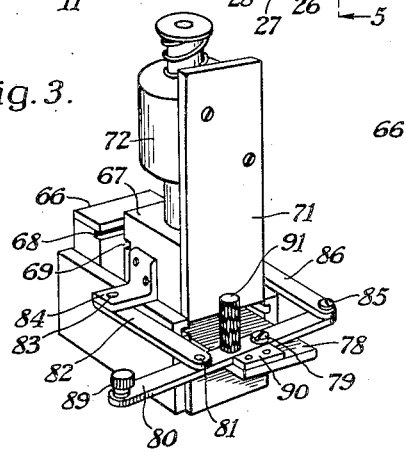
Fig. 3 is a perspective view of the film notching or marking device.
Figure 4:
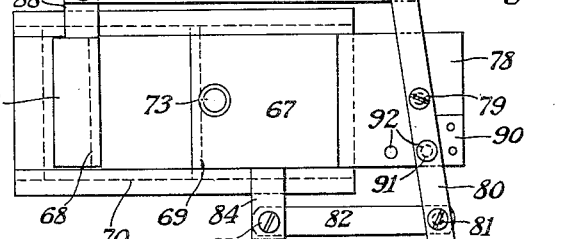
Fig. 4 is a plan view of the notching mechanism illustrated in Fig. 3.

As mentioned above, in order to adapt the notching device to films of different widths, members 66 and 67 are made adjustable or movable. To secure this result, the base 65 has extending forwardly thereof a plate or bracket 78 on which is pivoted at 79 a lever 80. The left-hand end of the lever 80, as viewed in Fig. 3, has pivoted thereon at 81 a link 82, the other end of which is pivotally connected at 83 to a lug 84 projecting laterally from one side of the member 67, as best shown in Fig. 4. On the other side of the pivot 79, the lever 80 has pivotally connected thereto at 85 a second link 86, the other end of which is pivoted at 87 to a lug 88 extending from the member 66, as shown in Figs. 3 and 4. The free end of the lever 80 is provided with an operating handle 89, as best shown in Fig. 3. It will now be apparent from an inspection of Figs. 3 and 4 that if the lever 80 is pivoted in a clockwise direction about its pivot 79, the link 82 will move rearwardly to shift the member 67 to the left while the link 86 will be moved forwardly to shift the member 66 to the right to move the members 66 and 67 closer together. On the other hand, a counter-clockwise movement of the lever 80 upon its pivot 79 will shift the links 82 and 86 to the right and left, respectively, to similarly move the members 66 and 67 to increase the space therebetween to receive a film of greater width. Thus by operating the lever 80 in the proper direction, films of two widths, for example, 16-mm. and 35-mm., can be positioned for notching. A stop member 90 is carried by the bracket 78 and is positioned in the path of the lever 80 to limit the movement thereof in either direction of rotation about pivot 79 to properly position the members 66 and 67. A retractable pin 91 extends through an opening formed in the lever 80 and is adapted to extend into one of the apertures 92 formed on plate 78 to retain the lever 80 in its adjusted positions, as will be apparent from Figs. 3 and 4.

As is well known, it may be necessary or desirable to adjust the color of the printing light in accordance with the type of film being printed. While the color temperature of the light itself may be adjusted directly, it is preferred to maintain the lamp temperature constant and to alter the printing light by means of various colored filters positioned in the printing aperture. However, in order to ascertain the proper filter to be used with a particular film emulsion, it may be necessary to make various prints of the step tablet on the film F, using different types of filters for a desired number of prints. The printed strip may then be processed and examined to determine the type and color filter best adapted for use with the particular film emulsion, and the selected filter is then placed in the printing aperture. This test may be carried out, of course, by changing repeatedly the filters at the printing aperture. The present invention, however, provides a novel arrangement by which these various filters may be mounted and successively brought into printing position.

To this end, a second drum 95, known as the filter drum, is mounted inside and concentric with the printing drum 23 and is positioned between the latter and the printing aperture 21, as best shown in Fig. 5. This filter drum rotates independently of the printing drum and is provided with a plurality of apertures 96 arranged around the peripheral rim 97 thereof, the various apertures being covered by filters 98 of different colors and/or light-transmitting characteristics. The filter drum 95 is carried by a shaft 99 which extends through and is supported by the hollow shaft 24 so that both the printing and filter drums are supported on the movable carriage 27, and are movable laterally as a unit toward or away from the printing aperture. The position of the filter drum relative to the printing aperture is controlled by an arm 100 carried by the outer end of the shaft. By rotating the arm 100, the desired filter 98 may be brought into operating position over the printing aperture to vary the color of printing light applied to the step tablet to print the latter. A spring pressed pin 101 is carried by the end of arm 100 and is adjusted to engage selectively in a group of recesses or notches 102 formed in a circular plate 103 carried by one of the supports 26 as best shown in Figs. 2 and 5.

The operation is as follows: The machine is started by connecting the motor 60 to a source of power, and as the film strip F moves over the printing drum 23 and in contact with the step tablet 36 to have printed thereon the image of the step tablet, the arm 100 is moved to bring the pin 101 into one of the recesses 102 of plate 103. This will position one of the filters in registry with the printing aperture. The handle is rotated part-way after each revolution of the drum to bring another filter into position. After prints have been made with the different filters, the proper filter suitable to the particular film emulsion is then selected, and this type and color of filter is then placed in the printing aperture 21 so as to provide the proper color of printing light. The control arm 100 is then returned to a neutral position, say at the top of plate 103. This will serve to rotate the filter drum to bring a blank or unfiltered aperture 96 over the printing aperture. The motor 60 is again started to drive the film F and thus rotate the printing drum to print repeatedly the images of the step tablet on the strip F. During this printing operation, the filter drum 95 remains stationary by reason of the engagement of the spring press pin in one of the recesses 102 of the plate 103, but the proper filter is in position in the printing aperture 21.

As mentioned above, the images on the step tablet 36 are separated by marginal notches 77 formed on the film strip F. For obvious reasons, these notches are formed in timed relation to the rotation of the printing drum 23. For this reason, the latter may be utilized to control the operation of the solenoid 72 to form the notches 77 in the film strip. To this end, carriage 27 has mounted thereon a "Micro" switch 105 which is connected, in any suitable well-known manner, to the solenoid 72. Upon the closing of the switch 105 the solenoid will be energized momentarily to move the plunger 73 downwardly to notch the film. In order to control the operation of the solenoid from the rotating printing drum 23, the latter is provided with an operating member 106 projecting laterally from the side wall 107 thereof. Each time the drum rotates, the member 106 engages and moves a flexible contact arm 108 of the "Micro" switch into engagement with a fixed contact 109 to close the switch, as will be apparent from an inspection of Figs. 1 and 5. Such closing of the "Micro" switch 105 energizes the notching mechanism to notch the film, such notching being in exact time relation to the rotation of the printing drum and the successive printings of the step tablet on the film strip F. Thus each image of the step tablet is separated by notches so that the separate images may be detached from the film strip merely by cutting the latter at the notched portions. This provides a simple and easy way of designating the locations of the various step tablet images on the film strip. When the member 106 passes the movable contact, the "Micro" switch opens to de-energize the solenoid which then moves upwardly under the action of springs 111 and 112. An arm 113 is engaged by the upper end 114 of the plunger to limit the upward movement of the latter, as shown in Fig. 8.

In order that different printing drums and/or filter drums may be easily replaced, making the device usable for a wide range of subjects and films, the printing and filter drums are both mounted on the slidable carriage 27. When a new printing drum or filter drum is to be used, the carriage 27, as viewed in Fig. 5, is moved to the left to move the drums away from the printing aperture. An operating handle 115 secured to the carriage 27 facilitates a sliding movement. When the drums 23 and 95 have been moved to their inoperative position, one or both drums may be replaced, whereupon the carriage is slid to the right to its operative position as shown in Fig. 5, in which position the drums overlie the printing aperture 21. While both drums are slidable as a unit into and out of operative position, during the printing operation the filter drum 95 is held stationary while the printing drum 23 rotates freely on the carriage, being driven solely by the movement of film strip F thereover.

By means of the above-described apparatus, successive duplicate images of a step tablet or other master member are printed on a moving film strip or web, and the latter is automatically notched between successive printings to indicate the positions thereof on the strip. A calibrated light is provided, but the color of the printing light actually used is varied by means of filters to suit the particular type of film emulsion. The film strip is moved at a constant and uniform speed over the printing drum so that all portions that are subjected to the step tablet receive the same exposure to provide exact duplicate prints of the tablet. These prints can be used to determine the condition of the processing solutions of subsequent processing operations, as mentioned above.

While one embodiment of the invention has been disclosed, it is to be understood that the inventive idea may be carried out in a number of ways. This application is, therefore, not to be limited to the precise details disclosed but is intended to cover all variations and modifications falling within the scope of the appended claims.

I claim:

1. In a photographic printing apparatus, the combination of a support, a carriage slidably mounted on said support, a drum freely rotatable and detachably mounted on said carriage, said drum having a peripheral flange formed with an exposure aperture extending part way thereof, a light modulating member of a length less than the circumference of said flange and secured to the latter over said aperture, means for moving a web of sensitized material at a constant speed over said drum and in overlying and contacting relation with said member to rotate said drum as a unit with said web, a small printing aperture arranged in registry with said exposure aperture and positioned below and adjacent said flange so that said member will pass thereover, a calibrated light supplied to said printing aperture to print repeatedly exact duplicate images of said member on said web and means for sliding said carriage on said support to move said apertures out of registry.

2. In a photographic printing apparatus the combination of, a rotatable drum having an exposure aperture formed in the periphery thereof, a light modulating member carried by said drum and positioned over said aperture, means for moving a web of sensitized material at a constant speed over said drum and in contact with said member at said aperture to rotate said drum, a calibrated light source directed at said aperture and toward said member to print repeatedly the image of said member on said web, and means for marking said web to designate the positions of the images of said member on said web.

3. In a photographic printing apparatus the combination of, a rotatable drum having an exposure aperture formed in the periphery thereof, a light modulating member carried by said drum and positioned over said aperture, means for moving a web of sensitized material at a constant speed over said drum and in contact with said member at said aperture to rotate said drum, a calibrated light source directed at said aperture and toward said member to print repeatedly the image of said member on said web, means for marking said web to designate the positions of the images of said member on said web, and means controlled in timed relation with the movement of said web for actuating said marking means.

4. In a photographic printing apparatus the combination of, a rotatable drum having an exposure aperture formed in the periphery thereof, a light modulating member carried by said drum and positioned over said aperture, means for moving a web of sensitized material at a constant speed over said drum and in contact with said member at said aperture to rotate said drum, a calibrated light source directed at said aperture and toward said member to print repeatedly the image of said member on said web, means for marking said web to designate the positions of the images of said member on said web, and means controlled by said rotating drum for actuating said marking means.

5. In a photographic printing apparatus the combination of, a rotatable drum having an exposure aperture formed in the periphery thereof, a light modulating member carried by said drum and positioned over said aperture, means for moving a web of sensitized material at a constant speed over said drum and in contact with said member at said aperture to rotate said drum, a calibrated light source directed at said aperture and toward said member to print repeatedly the image of said member on said web, means for notching the edge of said web at spaced points therealong to designate the positions of said images thereon, electric means for operating said notching means, a switch, and means on said drum adapted to operate said switch to control said notching means in timed relation to the movement of said web.

6. In a photographic printing apparatus the combination of, a rotatable drum having an exposure aperture formed in the periphery thereof, a light modulating member carried by said drum and positioned over said aperture, means for moving a web of sensitized material at a constant speed over said drum and in contact with said member at said aperture to rotate said drum, a calibrated light source directed at said aperture and toward said member to print repeatedly the image of said member on said web, means for marking said web to designate the positions of the images of said member on said web, means controlled in timed relation with the movement of said web for actuating said marking means, and adjustable web supporting means associated with said marking means.

7. In a photographic printing apparatus, the combination of a support, a carriage slidably mounted on said support, a drum freely rotatable and detachably mounted on said carriage, said drum having an overhanging peripheral flange formed with an exposure aperture extending part way thereof, a light modulating member of a length less than the circumference of said flange and secured to the latter over said aperture, means for moving a web of sensitized material at a constant speed over said drum and in overlying and contacting relation with said member to rotate said drum as a unit with said web, a small printing aperture positioned below and adjacent said flange so that said member will pass thereover, a calibrated light supplied to said printing aperture to print repeatedly exact duplicate images of said member on said web, and a filter removably positioned in said printing aperture to vary the quality of the printing light reaching said member to print the latter said carriage being slidable to move said exposure aperture to and from registering relation with said printing aperture.

8. In a photographic printing apparatus the combination of, a rotatable drum having an exposure aperture formed in the periphery thereof, a light modulating member carried by said drum and positioned over said aperture, means for moving a web of sensitized material at a constant speed over said drum and in contact with said member at said aperture to rotate said drum, a calibrated light source directed at said aperture and toward said member to print repeatedly the image of said member on said web, adjustable filter means arranged within and concentric with said drum and selectively positionable in registry with said aperture to vary selectively the character of the printing light reaching said member, and means for adjusting said filter means independently of said drum.

9. In a photographic printing apparatus the combination of, a rotatable drum having an exposure aperture formed in the periphery thereof, a light modulating member carried by said drum and positioned over said aperture, means for moving a web of sensitized material at a constant speed over said drum and in contact with said member at said aperture to rotate said drum, a calibrated light source directed at said aperture and toward said member to print repeatedly the image of said member on said web, adjustable filter member rotatably mounted within and concentric with said drum to vary selectively the character of the printing light reaching said member, means independent of said drum for rotating said filter member to adjust the latter, and means for retaining said filter member in adjusted fixed position relative to said rotatable drum.

10. In a photographic printing apparatus the combination of, a rotatable drum having an exposure aperture formed in the periphery thereof, a light modulating member carried by said drum and positioned over said aperture, means for moving a web of sensitized material at a constant speed over said drum and in contact with said member at said aperture to rotate said drum, a second drum positioned within and concentric with said first drum, a calibrated light source arranged to extend into said second drum and to be directed radially outwardly toward said aperture, a printing aperture associated with said light source, a plurality of light filters carried by said second drum, and means for moving said second drum relative to and independently of said first drum to move said filters selectively into position in registry with said printing aperture.

11. In a photographic printing apparatus the combination of, a rotatable drum having an exposure aperture formed in the periphery thereof, a light modulating member carried by said drum and positioned over said aperture, means for moving a web of sensitized material at a constant speed over said drum and in contact with said member at said aperture to rotate said drum, a second drum positioned within and concentric with said first drum, a calibrated light source arranged to extend into said second drum and to be directed radially outwardly toward said aperture, a printing aperture associated with said light source, a plurality of light filters carried by said second drum, means for moving said second drum relative to and independently of said first drum to move said filters selectively into position in registry with said printing aperture, and means for holding said drum to retain the selected filter in registry with said printing aperture.

12. In a photographic printing apparatus the combination of, a rotatable drum having an exposure aperture formed in the periphery thereof, a light modulating member carried by said drum and positioned over said aperture, means for moving a web of sensitized material at a constant speed over said drum and in contact with said member at said aperture to rotate said drum, a calibrated light source directed at said aperture and toward said member to print repeatedly the image of said member on said web, means for marking said web to designate the positions of the images of said member on said web, said marking means comprising a pair of adjustable supporting guides adapted to support said web at the opposite edges thereof, means for moving said guides toward or away from each other to accommodate webs of different width, and means for holding said guides in adjusted position.

13. In a photographic printing apparatus the combination of, a support, a carriage slidably mounted on said support, a drum freely rotatable and detachably mounted on said carriage, said drum having an exposure aperture formed in the periphery thereof, a light modulating member carried by said drum and positioned over said aperture, means for moving a web of sensitized material at a constant rate over said drum and in contact with said member to rotate said drum, a second drum mounted on said carriage and positioned within and concentric with said first drum, a plurality of light filters carried by said second drum, a calibrated light source, means for directing said light source axially, into said second drum and then radially thereof through said filters to said exposure aperture, a printing aperture for said light source adjacent said filters, means for rotating said second drum relative to said first drum to bring said filters selectively into position in registry with said printing aperture, said light source serving to print repeated images of said member on said web, means for notching said exposed web between said printings, adjustable guides on said notching means for accommodating films of different widths, and means operated by said first drum for controlling the operation of said notching means.

14. In a photographic printing apparatus the combination of, a support, a carriage slidably mounted on said support, a drum freely rotatable and detachably mounted on said carriage, said drum having an exposure aperture formed in the periphery thereof, a light modulating member carried by said drum and positioned over said aperture, means for moving a web of sensitized material at a constant rate over said drum and in contact with said member to rotate said drum, a second drum mounted on said carriage and positioned within and concentric with said first drum, a plurality of light filters carried by said second drum, a calibrated light source, means for directing the rays from said light source axially into said second drum and then radially thereof through said filters to said exposure aperture, a printing aperture for said light source adjacent said filters, means for rotating said second drum relative to said first drum to bring said filters selectively into position in registry with said printing aperture, said light source serving to print repeated images of said member on said web, means for notching said exposed web between said printings, adjustable guides on said notching means for accommodating films of different widths, means operated by said first drum for controlling the operation of said notching means, means for retaining said second drum in adjusted positions to retain the selected filter in position in registry with said printing aperture, and means for holding said guides in adjusted position

HAROLD L. FITCH.

REFERENCES CITED

The following references are of record in the file of this patent:

UNITED STATES PATENTS

| Number | Name | Date |
| --- | --- | --- |
| 1,821,399 | Owens | Sept. 1, 1931 |
| 2,007,018 | La Porte | July 21, 1935 |
| 2,086,289 | Wahl | July 6, 1937 |
| 2,093,785 | Sullivan | Sept. 21, 1937 |
| 2,117,727 | Jones | May 17, 1938 |
| 2,174,194 | Nemnich | Sept. 26, 1939 |
| 2,231,470 | Hausman | Feb. 11, 1941 |
| 2,233,809 | Darby | Mar. 4, 1941 |
| 2,245,606 | Rauch | June 17, 1941 |
| 2,313,632 | Eggert et al. | Mar. 9, 1943 |
| 2,346,988 | Noel | Apr. 18, 1944 |
| 2,386,575 | Simmon et al. | Oct. 9, 1945 |
| 2,459,362 | Cary | Jan. 18, 1949 |

FOREIGN PATENTS

| Number | Country | Date |
| --- | --- | --- |
| 29,515 | Great Britain | of 1912 |